(12) United States Patent
Avellan et al.

(10) Patent No.: US 7,907,894 B2
(45) Date of Patent: Mar. 15, 2011

(54) SYSTEM AND METHOD FOR ENABLING ULTRA SMALL APERTURE COMMUNICATION ANTENNA USING SPECTRAL REPLICATION AND COHERENT FREQUENCY AND PHASE COMBINING

(75) Inventors: Abel Avellan, Miami, FL (US); Sriram Jayasimha, Hyderabad (IN)

(73) Assignee: EMC SatCom Technologies, Inc., Miami, FL (US)

( * ) Notice: Subject to any disclaimer, the term of this patent is extended or adjusted under 35 U.S.C. 154(b) by 0 days.

(21) Appl. No.: 12/822,759

(22) Filed: Jun. 24, 2010

(65) Prior Publication Data

US 2011/0028087 A1 Feb. 3, 2011

Related U.S. Application Data

(63) Continuation of application No. 12/771,628, filed on Apr. 30, 2010, which is a continuation-in-part of application No. 12/549,066, filed on Aug. 27, 2009.

(60) Provisional application No. 61/230,888, filed on Aug. 3, 2009.

(51) Int. Cl.
    *H04B 7/185* (2006.01)
(52) U.S. Cl. ...... 455/13.3; 455/427; 455/12.1; 455/3.01
(58) Field of Classification Search .................. 455/3.02, 455/3.01, 3.03, 427, 430, 452.1, 452.2, 12.1, 455/13.1, 447, 13.3, 13.2, 67.11, 67.13; 370/316, 370/318, 347
See application file for complete search history.

(56) References Cited

U.S. PATENT DOCUMENTS

| | | | |
|---|---|---|---|
| 4,539,565 A * | 9/1985 | Norsworthy | 342/128 |
| 5,233,626 A | 8/1993 | Ames | |
| 5,859,874 A | 1/1999 | Weideman | |
| 5,987,037 A | 11/1999 | Gans | |
| 6,088,351 A * | 7/2000 | Jenkin et al. | 370/347 |
| 6,154,501 A | 11/2000 | Friedman | |
| 6,157,812 A * | 12/2000 | Sarraf | 455/13.4 |
| 6,445,747 B1 | 9/2002 | Jafarkhani et al. | |
| 6,452,989 B1 | 9/2002 | Friedman | |
| 6,549,582 B1 | 4/2003 | Friedman | |
| 6,738,434 B2 | 5/2004 | Friedman | |
| 6,836,658 B1 | 12/2004 | Sharon et al. | |
| 6,865,238 B2 | 3/2005 | Friedman | |
| 7,039,119 B2 | 5/2006 | Friedman | |
| 7,231,178 B2 | 6/2007 | Friedman et al. | |
| 7,336,679 B2 | 2/2008 | Dillon | |
| 7,522,877 B1 | 4/2009 | Avellan et al. | |

(Continued)

OTHER PUBLICATIONS

Shoichi Narahashi and Toshio Nojima, "A New Phasing Scheme for Multitone Signal Systems to Reduce Peak-to-Average Power Ratio", Electronics and Commuications in Japan, Part 1, vol. 80, No. 1, 1997, pp. 89-99, Translated from Denshi Joho Tsushin Gakkai Ronbunshi, vol. 78-B-II, Nov. 1995, pp. 663-671.

(Continued)

*Primary Examiner* — John Lee
(74) *Attorney, Agent, or Firm* — Blank Rome LLP

(57) ABSTRACT

A system for enabling use of ultra-small aperture terminals in satellite communications is provided. The system comprises a transmitter configured to receive an input signal having information, a bandwidth, and an amplitude, replicate the input signal into two or more replications of the input signal, convert each of the two or more replications to have a frequency tuned to two or more corresponding satellite transponders while maintaining the bandwidth and all the information of the input signal, and combine the two or more replications into a single uplink signal. A transmit antenna is configured to transmit the uplink signal to the two or more satellite transponders.

13 Claims, 10 Drawing Sheets

U.S. PATENT DOCUMENTS

| | | | |
|---|---|---|---|
| 2004/0242173 | A1 | 12/2004 | Takeda |
| 2006/0045038 | A1* | 3/2006 | Kay et al. ............... 370/316 |
| 2006/0126750 | A1 | 6/2006 | Friedman |
| 2006/0291599 | A1 | 12/2006 | Strodtbeck et al. |
| 2007/0142009 | A1 | 6/2007 | Scarpa et al. |
| 2008/0214107 | A1 | 9/2008 | Dankberg et al. |
| 2008/0232240 | A1 | 9/2008 | Baum et al. |
| 2008/0311858 | A1 | 12/2008 | Cheng et al. |

OTHER PUBLICATIONS

S. Harahashi, K. Kumagai and T. Nojima, "Minimising peak-to-average power ratio of multitone signals using steepest descent method", Electronics Letters Aug. 31, 1995, vol. 31, No. 18, pp. 1552-1554.

Qest White Paper "ULNAs and ASI", Sep. 1, 2008, "How ultra-low-noise amplifiers may help to solve adjacent satellite interference problems for very small apertures", pp. 1-4.

Gagan L. Choudhury and Stephen S. Rappaport, "Diversity ALOHA-A Random Access Scheme for Satellite Communications", IEEE Transactions on Communications, vol. Com-31, No. 3, Mar. 1983, pp. 450-457 with Abstract.

Jayasimha, S. et al., "Reducing VSAT Aperture Via Satellite MIMI", IEEE, 2008, pp. 1-6.

* cited by examiner

SYSTEM AND METHOD FOR ENABLING ULTRA SMALL APERTURE COMMUNICATION ANTENNA USING SPECTRAL REPLICATION AND COHERENT FREQUENCY AND PHASE COMBINING

RELATED APPLICATIONS

The present application is a continuation of U.S. patent application Ser. No. 12/771,628, filed Apr. 30, 2010, which is a continuation-in-part of U.S. patent application Ser. No. 12/549,066, filed Aug. 27, 2009, which claims the benefit of U.S. Provisional Patent Application Ser. No. 61/230,888, filed Aug. 3, 2009, the contents of which are hereby incorporated by reference in their entirety.

BACKGROUND OF THE INVENTION

1. Field of the Invention

The present invention relates to a satellite communication system and method for enabling ultra small aperture receivers by transmitting multiple spectral replicas to ultra small aperture receivers that coherently combine in frequency and phase of the desired signals of the multiple spectral replicas. More particularly, the present invention enables ultra small aperture communications systems by boosting power density (by replication) to the receiving antenna enabling ultra small aperture antennas in frequency bands like C band and Ku band.

2. Background of the Related Art

Satellite communications systems typically comprise an earth station (called a "hub") and multiple geographically disperse smaller receiving antennas. Signals from the hub are transmitted on an uplink signal to the satellite, and retransmitted from the satellite to various smaller remote stations. The remote stations typically have a Very Small Aperture Terminal (VSAT) antenna. The antennas acquire the downlink signal from a particular satellite as that satellite passes through the field of view for that antenna.

As the aperture of the remote station antennas reduces, the G/T (antenna Gain/system noise Temperature) of the antenna degrades. This, in turn, reduces the effective difference between the desired signal and thermal noise and interference (C/(N+I)). As the antenna get smaller, the satellite's available power expended in the desired signal does not overcome the thermal noise and interference. Thus, usage of an ultra small aperture antenna is impractical.

In addition, as the aperture size decreases, the size of the beam gets wider. As the beam size increases, the field of view increases and the antenna is more likely to encounter more signals from multiple satellites that use the same frequency band (satellites are spaced as close as 2.5 degrees). As a result, VSAT antennas (with aperture sizes in the range of about 1.8-4.5 meters for C band and 9 cm-2.4 meters for Ku band) are susceptible to encountering Adjacent Satellite Interference (ASI). Such undesired signals interfere with the reception of the desired signal.

In practice, it is not feasible to utilize low-cost ultra small aperture terminal antennas (as small as about 80 cm for C band and 20 cm for Ku band). This is due to negative effects of low aperture resulting in an increase in ASI interference and a low G/T.

In addition, satellites have limited power and consequently have limited amounts of power which can be used to communicate uplink and downlink signals. Increasing power available on a satellite (i.e., its Equivalent Isotropically Radiated Power (EIRP)) can be very expensive. Moreover, if all (neighboring) satellites increased EIRP, the relative level of ASI (associated with using a small aperture antenna) would not reduce. However, the performance of a satellite communication link is proportional to the satellite power allocated to it. As link power increases (at additional cost), so does the link performance.

Thus, it is important to identify a controlled means of improving satellite communications systems, in particular (but not limited) to Fixed Service Satellites (FSSs) operating in lower frequency bands with 2 to 3 degrees of spacing between the satellites to allow the use of low-cost ultra small aperture terminals (for example, in improving the quality and reducing cost of DTH, i.e., Direct To Home, services).

SUMMARY OF THE INVENTION

Accordingly, it is an object of the invention to enable ultra small antennas to be used for satellite communications. It is a further object of the invention to increase the power provided to signals transmitted over satellite.

Accordingly, a satellite communications system includes a hub terminal which communicates with a remote terminal through a satellite. The hub terminal 100 includes a transmitting modulator, power booster, up-converter and Power Amplifier (PA), and a transmitting station. The transmitting modulator generates a modulated signal, which is output to the power booster. The power booster receives the modulated signal and generates a spectral replication of the signal. The signal is then up-converted and amplified, and transmitted as an uplink signal to the satellite via a transmitting antenna. A remote station antenna receives the corresponding downlink signal. Following LNB/LNA and down-conversion, the signal is passed to a receive diversity combiner. The diversity combiner aligns the replicated signals by frequency and phase and generates a power-boosted signal. Accordingly, the system enables the use of ultra small antennas by providing increased power and gain.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

Figure 1:
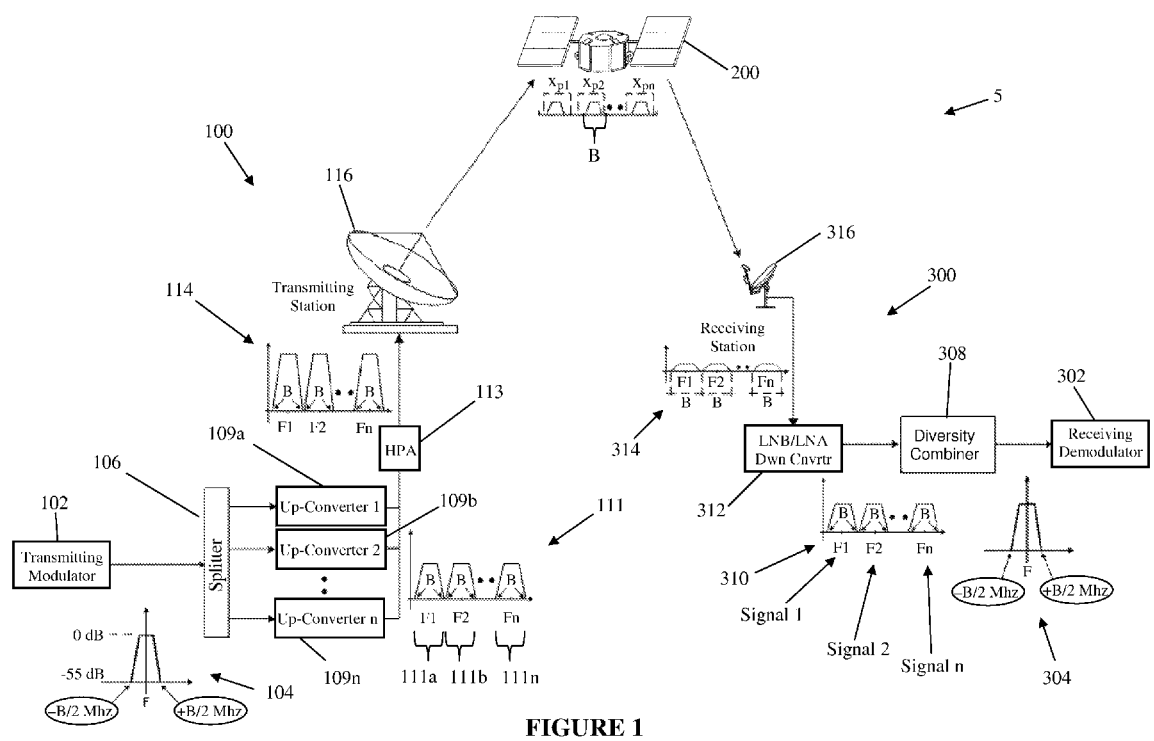
FIG. 1 is a block diagram of the satellite communications system in accordance with the preferred embodiment of the invention, using multiple satellite transponders of a single satellite.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose.

Turning to the drawing, FIG. 1 shows the overall satellite communications system 5 in accordance with a preferred embodiment of the invention. The system 5 generally includes a hub terminal 100 which communicates with a remote terminal 300 through a satellite 200. As shown, the hub terminal 100 includes a transmitting modulator 102, splitter 106, up-converters 109a, 109b, . . . , and 109n, High Power Amplifier (HPA) 113, and a transmitting station 116. The transmitting modulator 102 generates a modulated signal 104, or input signal, comprising information (i.e., data), a frequency, and a bandwidth.

The modulated signal 104 is output to a splitter 106, or multiplexer. The splitter 106 separates the modulated signal 104 to multiple converters 109a, 109b, . . . , and 109n. The converters 109a, 109b, . . . , and 109n process the modulated signal 104 into a combined signal 111 having multiple replicated signals 111a, 111b, . . . , and 111n. Each of the replicated signals 111a, 111b, . . . , and 111n contain the same information and have the same bandwidth as the modulated signal 104, but at different frequencies F1, F2, . . . , and Fn. Thus, the replicated signal 111 refers to a frequency-translated version of the input signal 104. It should be understood, however, that at least one of the replicated signals 111a, 111b, . . . , and 111n can be the actual input signal 104, which would correspond to a frequency-translation of zero.

The satellite 200 comprises a plurality of transponders for facilitating communication between the hub terminal 100 and the remote terminal 300. Each of the transponders of the satellite 200 has a single channel with a frequency bandwidth of 36 MHz or 72 MHz. The frequencies F1, F2, . . . , and Fn of the combined signal 111 are selected so that each of the replicated signals 111a, 111b, . . . , and 111n is tuned to a different transponder of the satellite 200 and has a frequency bandwidth of 36 MHz or 72 MHz, depending on the transponder to which that replicated signal 111a, 111b, . . . , and 111n corresponds. In FIG. 1, for example, replicated signal 111b is tuned to the frequency and bandwidth of transponder B of the satellite 200. In the alternative, as discussed in more detail below, each transponder may have multiple channels and each of the replicated signals 111a, 111b, . . . , and 111n may be tuned to a different channel in a single transponder.

In the embodiment illustrated in FIG. 1, the combined signal 111 is transmitted to the HPA 113, which amplifies the signal 111 to output an amplified uplink signal 114. As illustrated in FIG. 1, the amplification is performed by the HPA 113 after up-converting 109, but it be performed at the same time as up-converting, as with the up-converter and PA 112 in FIG. 6. The uplink signal 114 is then transmitted by the transmitting station 116 to the satellite 200. Accordingly, the system 5 transmits the uplink signal over multiple transponders (with a single carrier/channel on each transponder) of a single satellite 200.

The remote terminal 300 includes a receiving station 316, converter 312, diversity combiner 308, and demodulator 302. The receiving station 316 receives the downlink signal 314 from the transmitting station 116 via the satellite 200. The downlink signal 314 contains the same information and has the same bandwidth as the uplink signal 114, and the replicated signals 111a, 111b, . . . , and 111n are at the same frequencies F1, F2, . . . , and Fn. However, after being transmitted via the satellite 200, the downlink signal 314 will have lower power than the uplink signal 114. Accordingly, the receive signal 314 is sent to the LNB/LNA (Low-Noise Block/Low-Noise Amplifier) and down-converter 312, which generate an amplified and down-converted signal 310. The LNB converts the downlink signals to electrical signals and converts them to the L-band range, or any applicable frequency. The down-converted signal 310 is then input to the diversity combiner 308, which generates a coherently combined signal 304. The coherently combined signal 304 contains the same information and has the same bandwidth and frequencies as the downlink signal 314, but with increased power. The coherently combined signal 304 at the remote station 300 is intended to be the same as the original modulated signal 104 at the hub station 100. The coherently combined signal 304 is then demodulated by the receiving demodulator 302.

Figure 2:
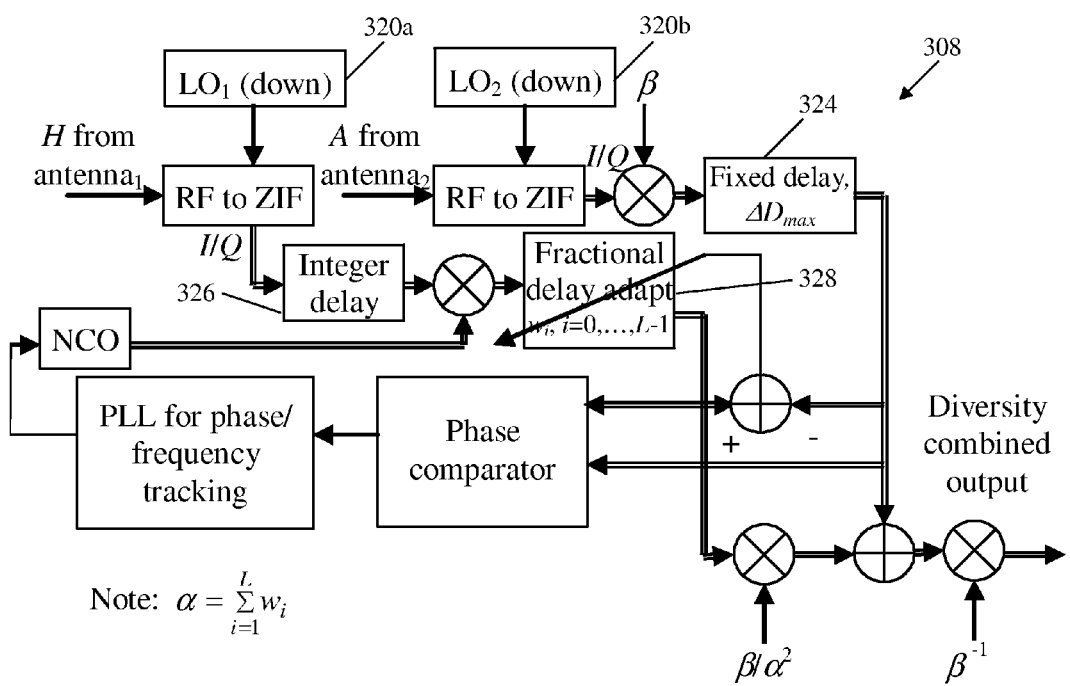
FIG. 2 is a block diagram of the diversity combiner of FIG. 1.

Turning to FIG. 2, the diversity combiner 308 is shown in greater detail. The two received signals are digitized (at a sampling rate consistent with the signal bandwidth) and down-converted to baseband by mixing each respective signal with a LO (Local Oscillator) 320a, 320b. One of the signals is multiplied by $\beta$ (this accounts for any gross differential gain at the two frequencies) and delayed by the maximum differential delay 324 that can be encountered (this is a fixed delay). The other signal is delayed by an adaptive integer sample delay 326, which is acquired by correlating the signals with each other. In the case that the transponders are on the same satellite 200, the integer sample delay, corresponding to the differential path delay at the two frequencies, may be a small number (if not 0).

The output of the integer sample delay 326 is mixed with a Numerically Controlled Oscillator (NCO) before it enters a fractional sample adaptive filter 328. The difference between the output of the adaptive filter 328 and the output of the fixed delay 324 is used to drive the adaptive filter 328 via a least mean square adaptive algorithm. In addition, the product of the outputs of the adaptive filter 328 and the fixed delay 324 drive a phase-locked loop, which in turn controls the NCO at the output of the integer sample delay 326. After a small settling time, the outputs of the adaptive filter 328 and the fixed delay 324 are aligned in time, frequency, phase, and amplitude. At that point, the outputs of the adaptive filter 328 and the fixed delay 324 can be weighted and summed (or, coherently combined, which denotes that the signals are configured to have the same delay, phase and frequency) after multiplying the output of the adaptive filter 328 by $\beta/\alpha^2$, where $$\alpha = \sum_{i=1}^{L} w_i.$$

Align two signals in frequency and phase and adding them in that manner is hereinafter referred to as "coherent combining."

Coherent combining two equal amplitude signals results in a 6 dB increase in signal level (i.e., the amplitude is doubled). Further, if the two signals are immersed in identically distributed but independent noise and interference, the diversity combiner's noise, for sufficiently small fraction delay 328 adaptation step-size $\mu$, noise and interference power increases by 3 dB. The net gain in signal-to-noise ratio (for equal strength signals and noises) is thus 3 dB. The more general case of unequal signal amplitudes and unequal noise powers is discussed below. It should be noted that the diversity combiner may be implemented as a low-cost Application-Specific Integrated Circuit (ASIC) in large quantities that is suited for such applications as DTH. In the present invention, certain assumptions (e.g., the maximum differential delay) can reduce the number of gate equivalents in the ASIC.

The following example illustrates how the coherent combining performed by the diversity combiner 308 maximizes the combined carrier-to-noise of the multiple replicas 310 when the replicas 310 are not of the same value as each other. In the general case, with signal-to-noise-plus-interference ratios $C_1/(N_1+I_1)$ and $C_2/(N_2+I_2)$, a simple, but sub-optimum scheme, brings the two carriers (which are correlated) to the same level and then adds them, resulting in output signal-to-noise-plus-interference ratio of $4C_1/[(N_1+I_1)+\alpha^2 (N_2+I_2)]$, where $\alpha^2$ is the adaptive filter that equalizes the two carrier powers (i.e., $C_2=\alpha^2 C_1$). For example, if we weight the adaptive signal output by $\beta$, the resulting signal-to-noise-plus-interference ratio is $(1+\beta)^2 C_1/[N_1+I_1)+\beta^2\alpha^2 (N_2+I_2)]$. Maximizing that ratio with respect to $\beta$, we get $$2(1+\beta)C_1[(N_1+I_1)+\beta^2\alpha^2(N_2I_2)]- 2\beta\alpha^2(N_2I_2)(1+\beta)^2 C_1 = 0,$$

or $$\beta_{opt}=(N_1I_1)/[\alpha^2(N_2+I_2)].$$

And, with equal noise-plus-interference, $(N_1+I_1)=(N_2+I_2)$, we get $\beta_{opt}=1/\alpha^2$ (i.e., we undo the adaptive gain). That is referred to as maximum ratio receiver combining (MRRC). To generalize it to M signals, it is optimized in pairs (where one of the signals is new and the other is the M-1 signal MRRC output). That can be repeated recursively (i.e., define M-1 MRRC in terms of a new signal and M-2 MRRC and so on until M=1).

Figure 3:
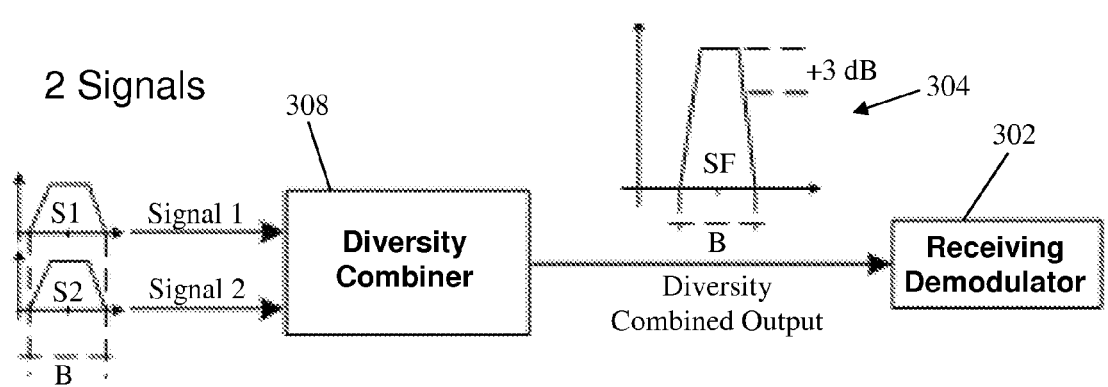
FIGS. 3-5 are block diagrams depicting the diversity combiner used for two or more signals.
Figure 4:
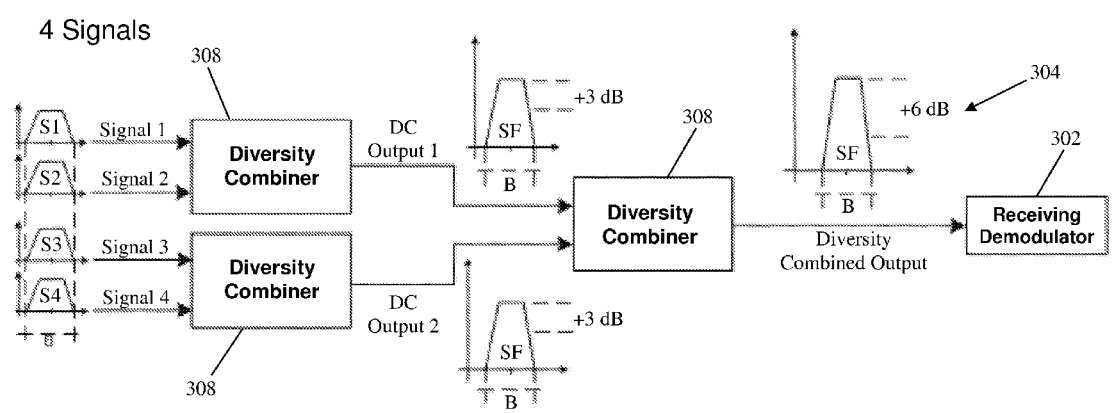
Figure 5:
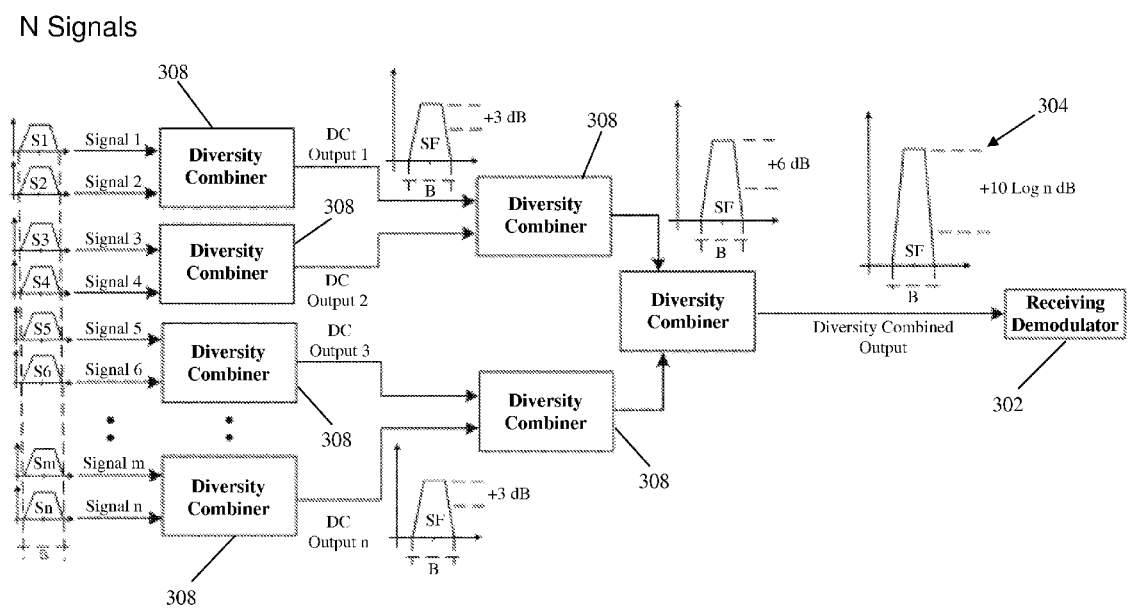

Referring to FIGS. 3-5, the diversity combiner 308 can be configured to perform coherent combining on any number of input signals 310. When the system 5 is utilized for communicating two signals 310, a single diversity combiner 308 is provided, as shown in FIG. 3. The diversity combiner 308 receives the two diverse signals 310 (which are labeled as Signal 1 and Signal 2 in FIGS. 1 and 3-5), and aligns those signals 310, then frequency and phase combines those signals 310 (Signal 1 and Signal 2) to provide the coherently combined signal 304 as a frequency and phase combined output. As shown, the coherently combined signal 304 has an increased signal-to-noise of 3 dB with respect to the input Signal 1 and Signal 2, while having the same bandwidth B as Signals 1 and 2. Coherent summation of the two signals increases power by 6 dB, but incoherent increase in noise and interference terms increases them by 3 dB; ideally, signal-to-noise ratio can improve by 3 dB, but that can be reduced, depending on actual system phase noise and step-size, $\mu$ used, to value in the range 2.5 dB-3 dB.

In FIG. 4, three diversity combiners 308a, 308b, and 308c are provided in a cascaded configuration to coherently combine four signals. The diversity combiners 308 are provided in two stages. In the first stage, two diversity combiners 308a and 308b are utilized, with the first diversity combiner 308a receiving Signal 1 and Signal 2 and the second diversity combiner 308b receiving Signal 3 and Signal 4. Each of the diversity combiners 308a and 308b increases the power level of the signal (3 dB in the embodiment shown). The output of the first stage signals are passed to the diversity combiner 308c in the second stage. Though the diversity combiners 308a, 308b, and 308c are shown as separate elements, they can be combined into a single component. The signal-to-noise ratio improvement obtained by replicating twice is (ideally) 3 dB (FIG. 3), while that for replicating the signal four times is (ideally) 6 dB (FIG. 4). The actual signal-to-noise ratio improvement must account for any increase in Peak-to-Average Power Ratio (PAPR) and inter-modulation noise (which is dependent the Total Output Power Back-off (TOPB) of the transponder from full saturation, and the number of replicas).

As illustrated in FIG. 5, the system 5 can process any number n of signals. Preferably, but not limited thereto, each diversity combiner 308 processes two signals at a time. Accordingly, for n signals, there are n-1 diversity combiners 308 (providing $3\times\log_2 n$-PAPR-inter-modulation noise increase dB of signal-to-noise ratio improvement), which reduces the number of diversity combiners required as, for example, where signals are combined after demodulation using known constellations. As can be seen from FIGS. 4-6, the greater the number, n, of replicated signals 111a, 111b, . . . , and 111n on the downlink signal 314, the greater the power on the coherently combined signal 304. And, the greater the power that can be obtained from the downlink signal 314, the smaller the aperture can be used for the antenna at the receiving station 316.

Figure 6:
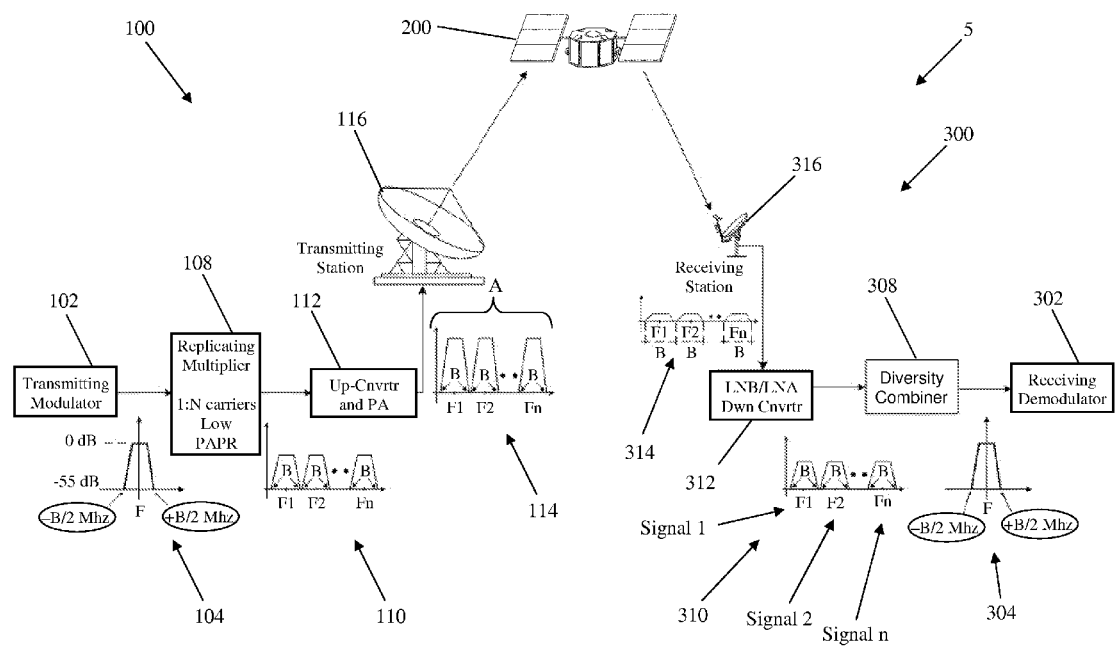
FIG. 6 is a block diagram of an alternative embodiment using one transponder of one satellite.

Turning to FIGS. 6-10, alternative preferred embodiments of the invention are shown. Referring momentarily back to FIG. 1, the system 5 preferably utilizes multiple transponders of a single satellite 200. Where there is only one replicated signal per satellite transponder, as shown in FIG. 1, there is no need to minimize PAPR because different satellite transponders have different power amplifiers. However, as shown in FIG. 6, the system 5 can also be configured to utilize one transponder of a single satellite 200 when, for example, an application calls for the use of a single transponder, multiple transponders are not available, or multiple replicated signals are to be transmitted over a single satellite transponder. But, to send multiple replicated signals with different frequencies (i.e., multiple carrier signals) over a single transponder, that transponder must have a corresponding number of channels with different frequencies. Accessing multiple channels of a single transponder with multiple carrier signals increases PAPR.

To provide multiple replicated signals 111a, 111b, . . . , and 111n on a single transponder (i.e., a multi-carrier spread spectrum), the phase of each replicated signal must be offset to correspond to a different channel of the transponder, similar to Frequency Division Multiple Access (FDMA) scheme. The phase offsets for those signals can be determined in accordance with any suitable manner. By replicating the input signal 104 and offsetting the phase of each replicated signal 111a, 111b, . . . , and 111n, the present invention is more effective at minimizing PAPR in satellite applications (specifically to reduce transponder TOPB) than other spectral expansion schemes. For example, a single carrier signal on a single transponder will have a PAPR of 3 dB; two carrier signals on a single transponder will have a PAPR of 3 dB; four carriers (at phases 0, 0.227π, 0.386π, and 1.05π, with slightly unequal I and Q amplitudes (by 0.05 dB)) on a single transponder have a PAPR of 2.02 dB; and eight carriers (with phases at 0, 0.25π, 0.02π, 0.81π, 0.69π, 0.93π and 0.75π, and I and Q amplitudes are equalized) on a single transponder will have a PAPR of 1.21 dB.

The present invention is more efficient than other spectral expansion schemes because it improves the efficiency of the HPA and the PA of the transponder, which helps prevent saturation of the transponder. Reducing PAPR also helps prevent saturation by reducing the signal peak power for a given transponder. Moreover, the technique of the present invention does not utilize a spread spectrum function and, therefore, does not require a spread spectrum error tracking generator or other devices otherwise needed to enable spread spectrum.

As the number, n, of carrier signals increases, signal distortion results in an increased number of inter-modulation products $O(n^2/2)$ that generate inter-modulation noise (which also depend on TOPB of the transponder and PAPR). Thus, as a practical matter, the number of carriers is limited to two (2), four (4), and eight (8) to avoid excessive inter-modulation products. By contrast, because the embodiment of FIG. 1 only has a single carrier signal for each single-channel transponder of the satellite 200, there are no inter-modulation products and, therefore, there is no need to be concerned with the PAPR. And, with n transponders, the system gains $3 \times \log_2 n$ dB in signal-to-noise-plus-interference.

By keeping the PAPR low in the embodiment of FIG. 6, the system 5 maximizes the available power on the satellite 200 by minimizing inter-modulation products generated in the case that multiple spectral replicas are transmitted using the same satellite transponder operating close to saturation. Inter-modulation products can occur by the satellite producing multiple downlink signals in the non-linear range of the uplink signal. Accordingly, it is important that the combined signal 110 be as near to constant envelope as possible to minimize the negative effects of the inter-modulation products resulting at the downlink signal of the satellite 200.

In the alternative preferred embodiment shown in FIG. 6, a power booster 108 is provided to replicate the signal 104. The combined signal 110 is then sent to the up-converter 112, which processes the combined signal 110 into a transmit signal 114 at higher frequencies F2, F3, . . . , and Fn. The PA amplifies the signal, so that the converted signal 114 has greater power with respect to the combined signal 110. The combined signal 110 (and thus the converted signal 114) is selected to be at frequencies F2, F3, . . . , and Fn that, combined, can access a corresponding number of channels on a single transponder of the satellite 200. As shown by label A in the embodiment of FIG. 6, the converted signal 114 has a combined bandwidth that is within the bandwidth and frequency of that single transponder (i.e., within 36 MHz or 72 MHz). The transmit or uplink signal 114 is then transmitted by the transmitting station 116 to the satellite 200 to each of the channels on the single transponder.

Figure 7:
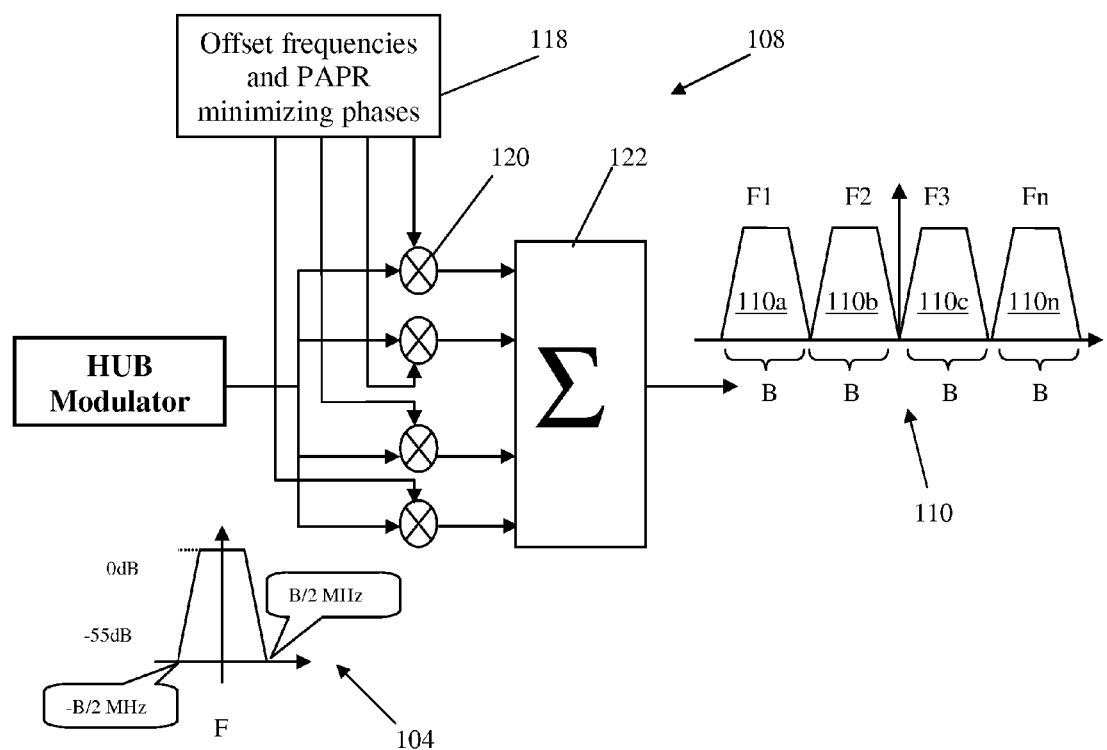
FIG. 7 is a block diagram of the power booster of FIG. 6.

FIG. 7 illustrates further details of the replicator or power booster 108 shown in FIG. 6. The power booster 108 receives an input signal 104 from the transmitting modulator 102 (FIG. 6) and generates a spectral replication of the input signal 104 in the form of multiple replications 110a, 110b, . . . , and 110n of the input signal 104 combined into a single, combined signal 110. The signal is input into n (four in the embodiment of FIG. 2) multipliers 120, together with offset frequencies and PAPR minimizing phases 118. The multipliers 120 then each provide as an output, the input signal 104 at different frequencies F1, F2, . . . , and Fn. The combiner 122 combines those outputs into a single combined signal 110. As shown, each of the signal replications 110a, 110b, . . . , and 110n has the same bandwidth B and amplitude as the original input signal 104, but are at different frequencies F1, F2, . . . , and Fn.

Returning to FIG. 6, the combined signal 110 has multiple copies 110a, 110b, . . . , and 110n of the received modulated signal 104. Each of the signals carries the same information over the same bandwidth as the modulated signal 104, but at different frequencies F1, F2, . . . , and Fn. The power booster 108 minimally degrades the PAPR of the modulated signal 104 when generating the combined signal 110. Accordingly, the combined signal 110 has a low PAPR. For example, with four replicated signals, the PAPR increase is 2.06 dB; and with eight replicated signals, the PAPR is increased by 1.6 dB, compared to a single carrier signal. If n signals are combined, without selecting phases that minimize PAPR, then the PAPR can be as much as $\sqrt{n}$ (i.e., 9 dB for 8 replicated signals).

Figure 8:
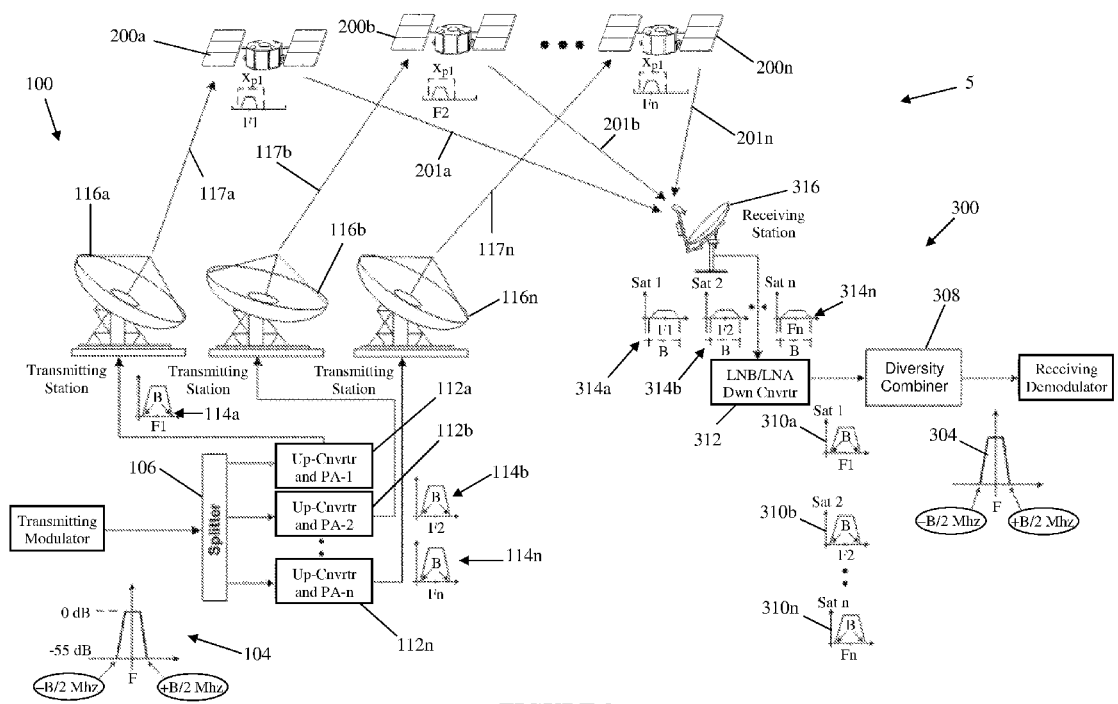
FIG. 8 is a block diagram in accordance with alternative embodiment of the invention using one transponder from each of multiple satellites.

FIG. 8 shows the system 5 in yet another alternative preferred embodiment utilizing one transponder for each of multiple satellites 200 (thus, a low PAPR need not be maintained). In that embodiment, a separate antenna is provided at the transmitting station 116a, 116b, . . . , and 116n for each of the satellites 200a, 200b, . . . , and 200n. Each antenna transmits a signal 114 over a single transponder of the respective satellite 200a, 200b, . . . , and 200n. There can be one transmitting station with multiple antennas, or multiple transmitting stations each having one antenna which are remote from each other.

The splitter 106 separates the signal to individual up-converter and PA devices 112a, 112b, . . . , and 112n that generate the up-converted and amplified signals 114a, 114b, . . . , and 114n, which have increased power (3 dB in the embodiment shown) over the modulated signal 104, respectively. The up-converted signals 114a, 114b, . . . , and 114n are transmitted to the satellites 200a, 200b, . . . , and 200n as uplink signals 117a, 117b, . . . , and 117n via transmit station antennas 116a, 116b, . . . , and 116n, respectively. The satellites 200a, 200b, . . . , and 200n then retransmit the uplink signals 117a, 117b, . . . , and 117n as downlink signals 201a, 201b, . . . , and 201n, respectively.

At the remote terminal 300, the antenna at the receiving station 316 separately receives each of the downlink signals 201a, 201b, . . . , and 201n from the respective satellites 200a, 200b, . . . , and 200n, at the respective frequency carriers on which the converted signals 114a, 114b, . . . , and 114n were generated. The receiving station 316 passes each of the received signals 314a, 314b, . . . , and 314n to the LNB/LNA down-converter 312, which sends amplified converted signals 310a, 310b, . . . , and 310n to the diversity combiner 308. The diversity combiner 308 generates a boosted, coherently combined signal 304 having increased power for each of the converted signals 310a, 310b, . . . , and 310n. The combination of multi-carrier PAPR minimization and coherent frequency and phase combining with a single transponder has benefits when the antenna aperture at the receiving station 316 has insufficient gain, receives significant ASI, or both. That is because the signal is boosted relative to noise and interference components, as described above.

Figure 9:
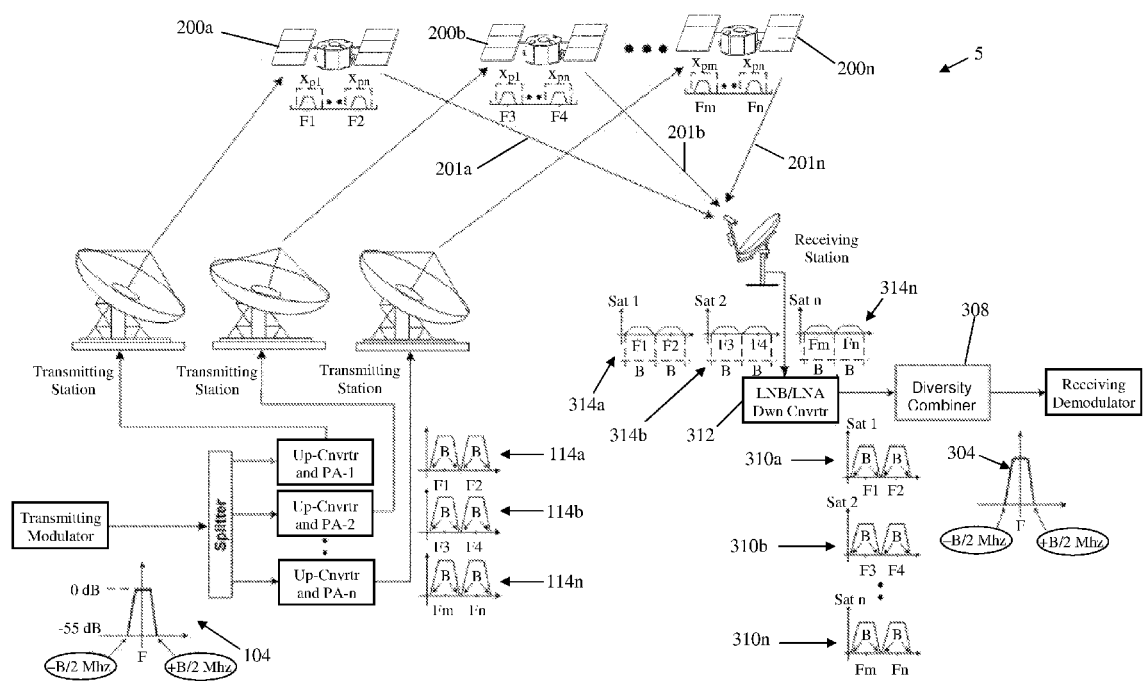
FIG. 9 is a block diagram in accordance with another alternative embodiment of the invention using two transponders from each of multiple satellites.

FIG. 9 shows another embodiment of the invention, where the system 5 uses multiple transponders in multiple satellites 200. Conceptually, the embodiment is merely a combination of the embodiments of FIG. 1 and FIG. 8. However, with respect to PAPR, there are some technical differences based on the manner in which the embodiment of FIG. 6 addresses PAPR. More particularly, when different transponders in different satellites 200a, 200b, . . . , and 200n are used to transmit each carrier signal (i.e., each of the signal replications 111a, 111b, . . . , and 111n or 114a, 114b, . . . , and 114n), the PAPR that would otherwise be encountered in the HPA of the ground transmitter and the PA of the satellite transponder is reduced, along with TOPB of the transponder, thereby avoiding saturation. Thus, the embodiment of FIG. 9 provides the advantages of the embodiment of FIG. 1 for the transponders of each of the separate satellites 200a, 200b, . . . , and 200n of the embodiment of FIG. 8.

Figure 10:
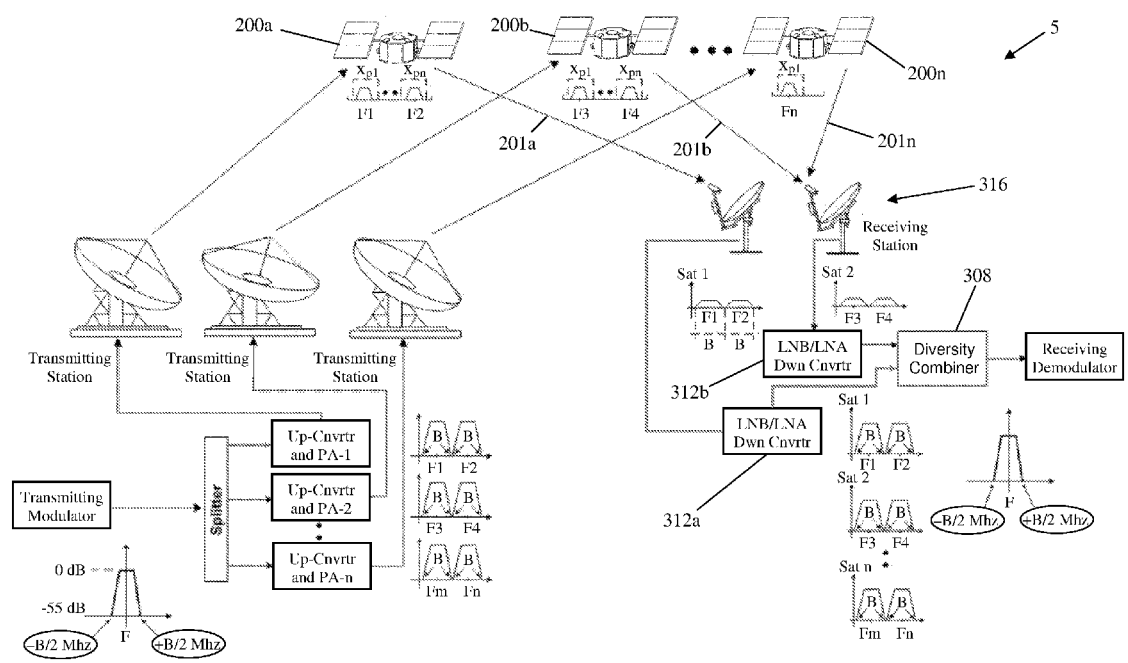
FIG. 10 is a block diagram in accordance with another alternative embodiment of the invention using a single transponder from each of multiple satellites and having multiple receiving antennas.

FIG. 10 shows the system 5 using multiple satellites 200a, 200b, . . . , and 200n with multiple antennas at the receiving station 316. Each antenna may receive one or more of the downlink signals 201a, 201b, . . . , and 201n. In the embodiment shown, a first antenna at the receiving station 316 receives the first downlink signal 201*a* and a second antenna at the receiving station 316 receives the other downlink signals 201*b*, . . . , and 201*n*. Accordingly, a separate LNB/LNA down-converter 312*a* and 312*b* is provided for each of the antennas. It is noted that the diversity combiner 308 can process the signals from the various satellites in any order. For example, a first stage of diversity combiners 308 can combine the two signals from Sat 1 and the two signals from Sat 2, then a second stage can combine those combined signals. Alternatively, a first diversity combiner 308 can combine the first signal of Sat 1 with the first signal of Sat 2, a second diversity combiner 308 can combine the second signal of Sat 1 with the second signal of Sat 2, and a third diversity combiner 308 can combine the results form the first and second diversity combiners 308.

FIGS. 6-10 show different embodiments of the invention. All of those figures provide replicated signals that are used to maximize the power obtained from the respective satellite(s). Regardless of whether one or multiple transponders, transmitting antennas, satellites, or receiving antennas are used, a signal 310 is obtained that is then power boosted. The power boosted, coherently combined signal 304 enables a small aperture or ultra small aperture receiving antenna 316 to be used, while maintaining gain and without having to increase the power at the satellite(s) 200. Replication increases the transmit power (by 3 dB), whereas the diversity combining increases the signal component by as much as 6 dB (for two equal amplitude inputs), and also increases noise and interference by 3 dB. The system of the present invention improves the link margin when there is inadequate EIRP, without actually increasing EIRP.

In the embodiments shown, the operation of the modulator 102, power booster 108, and up-converter 112 or 109, splitter 106, HPA 113, as well as the operations of the demodulator 302, diversity combiner 308, and the down-converter 312, are preferably implemented by any suitable computing processor or processing platform that is capable of performing the functions and operations in accordance with the invention. The computing platform is preferably, for example, a Field Programmable Gate Array (FPGA) or an Application-Specific Integrated Circuit (ASIC). In particular, the power booster 108 and the diversity combiner 308 are implemented by the FPGA or ASIC device, either in a stand alone system or fully integrated with the modulator 102 or demodulator 302. All or parts of the system and processes can be stored on or read from a memory or computer readable media. The modulator 102 and demodulator 302 are preferably standard off the shelf equipment.

To illustrate the foregoing with a practical example, consider an 80 cm C-band antenna. For a satellite EIRP of 39 dBW, even at the lowest rate DVB-S2 option (QPSK, i.e., Quadrature Phase-Shift Keying, code rate-1/4), signal power is insufficient to overcome noise and interference. Instead, in accordance with the present invention, two DVB-S2 modulators at hub (modulation and M/N coding to be determined after calculating the diversity-combined signal-to-noise plus interference ratio) are configured with identical data on two transponders on the same satellite on the uplink Receiver diversity combines the two transponder signals (gaining ~2.5 dB on both ASI and Carrier-to-Noise (C/N) ratio ~2.7 dB with 2 dB fade/scintillation margin, assuming C/(N+1)=2 dB and a DVB-S2 QPSK 2/5 is selected (i.e., the undetermined modulation is established to be QPSK and coding is established to be rate 2/5 LDPC)). Thus, at the additional cost of tuner and diversity combiner at the remote, the present invention enables a 0.4 bps/Hz channel And, the present invention increases total satellite power by 3 dB (because of use of the original power on each of the two transponders) and increases bandwidth, but enables a channel at a net rate not possible using a single (non-replicated) channel using available DVB-S2 modulations.

Coherent frequency and phase combining of multiple spectral replicas allows boosted receiver power output. Replication can use multiple transponders or spread information to multiple sub-carriers within a transponder (while minimizing PAPR).

The combination of power boosting, coherent frequency combining, and using one or multiple transponders (or frequencies or satellites or other similar means for replication) has benefits when the antenna aperture of the antenna at the receiving station 316 has insufficient gain (such as for small and ultra small aperture antennas), encounters significant ASI, or both. The power booster 108 or splitter 106 boosts the power, which improves the signal-to-noise ratio at the diversity combiner 308. In the example cited above, PAPR-minimized spectral replication is not needed since one-transponder data is replicated across many transponders. In the present invention, the same source data is fed to multiple modulators and there is no need to adjust phasing of each modulator.

It should be noted that devices described as being in communication with one another need not be in continuous communication with each other. And, devices described as being in communication with each other may communicate directly or indirectly through one or more intermediaries.

In addition, the foregoing splitter 106, up-converter 109, HPA 113 and/or replicator 108 may be conveniently integrated with the transmitting modulator of a modem and the foregoing diversity combiner 308 and down converter 312 may be conveniently integrated into the receiving demodulator of a modem (e.g., a DVB-S2 modem). When integrated with a modem, the method of signal replication/splitting of the present invention will be performed after the signal modulation of the modem is performed, and the signal demodulation of the modem will be performed after the method of signal combining of the present invention is performed. Accordingly, a single modem can be used to modulate the carrier signal before it is replicated/split, up-converted, and transmitted via n channels according to the method of the present invention. And, the signals on those channels can be demodulated by a single modem after they are down-converted and coherently combined according to the method of the present invention. That configuration allows the present invention to operate without losing signal energy in a pulse-shaping filter and eliminates the need to know the nominal symbol rate a priori.

More particularly, some conventional systems use a pulse-shaping filter on a given transmit signal in a QAM constellation to contain the spectrum. If a phase estimation technique is employed, the constellation would have to be assumed (i.e., known a priori) at the remote terminal 300. Although that method can be used to help enhance signal-to-noise ratio, it undesirably loses signal energy. By contrast, the present invention estimates the phase and frequency difference between signals during coherent combining, which eliminates the need to know or assume the constellation and, in terms of performance, the noise variance injected by phase error is therefore lower than in conventional systems that use constellation information. Modems operate using constellation information. And, by integrating the present invention with a modem, signal energy losses that would otherwise be experienced by the modem can be avoided.

The foregoing description and drawings should be considered as illustrative only of the principles of the invention.

Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A system for enabling use of ultra-small aperture terminals in satellite communications, the system comprising:
    a transmitter configured to
        receive an input signal having information, a bandwidth, and an amplitude, replicate the input signal into two or more replications of the input signal, convert each of the two or more replications to have a frequency tuned to two or more corresponding satellite transponders while maintaining the bandwidth and all the information of the input signal, and
        combine the two or more replications into a single uplink signal; and
    a transmit antenna configured to transmit the uplink signal to a receiver via the two or more satellite transponders, the receiver having a receive antenna configured to receive a re-transmission of the uplink signal from the two or more satellite transponders and a diversity combiner configured to coherently combine the two or more replications into an output signal by phase and frequency using one or more diversity combiners arranged in a cascading arrangement, the one or more diversity combiners being configured to impart an increase in power and signal-to-noise ratio on the output signal as compared to the input signal.

2. The system of claim 1, wherein the transmitter is further configured to convert each of the two or more replications to have the frequency tuned to the two or more corresponding satellite transponders while maintaining the amplitude of the input signal.

3. The system of claim 1, wherein one of the two or more replications is the input signal.

4. The system of claim 1, wherein
    the transmitter is configured to convert the two or more replications to have a frequencies that, when combined, are within the frequencies and bandwidth corresponding to a single satellite transponders; and
    the transmit antenna transmits the uplink signal to the single satellite transponder.

5. The system of claim 4, wherein the two or more replications reduce Peak-to-Average Power Ratio (PAPR) for the system compared to a system that utilizes only one replication.

6. The system of claim 4, wherein the two or more replications reduce Peak-to-Average Power Ratio (PAPR) for the system compared to a system that utilizes only one replication.

7. The system of claim 1, wherein the two or more satellite transponders are at a same satellite.

8. The system of claim 7, further comprising a second a transmit antenna configured to transmit the second uplink signal to the two or more satellite transponders on the second satellite.

9. The system of claim 1, wherein the transmitter is further configured to
    replicate the input signal into four or more replications of the input signal, convert at least two of the four or more replications to have a frequency tuned to two or more corresponding satellite transponders on a first satellite while maintaining the bandwidth and all the information of the input signal,
    convert at least two other of the four or more replications to have a frequency tuned to two or more corresponding satellite transponders on a second satellite while maintaining the bandwidth and all the information of the input signal,
    combine the at least two of the four or more replications tuned to the first satellite into a first uplink signal, and
    combine the at least two other of the four or more replications tuned to the second satellite into a second uplink signal.

10. The system of claim 1, wherein said diversity combiner is integrated with a modem.

11. The system of claim 1, wherein one of the two or more replications is the input signal.

12. The system of claim 1, wherein the two or more satellite transponders are at a same satellite.

13. A system for enabling use of ultra-small aperture terminals in satellite communications, the system comprising:
    a receive antenna configured to receive a downlink signal from two or more satellite transponders, the downlink signal being a re-transmission of an uplink signal, the uplink signal comprising two or more replications of an input signal having information, a bandwidth, and an amplitude, and each of the two or more replications of the input signal having a frequency tuned to the two or more satellite transponders while maintaining the bandwidth and all the information of the input signal; and
    a diversity combiner configured to
        receive the downlink signal from the receive antenna, and
        coherently combine the two or more replications into an output signal by phase and frequency one or more diversity combiners arranged in a cascading arrangement, the one or mom diversity combiners being configured to impart an increase in power and signal-to-noise ratio on the output signal as compared to the input signal.

\* \* \* \* \*